United States Patent
Friedrichs et al.

(10) Patent No.: US 7,620,492 B2
(45) Date of Patent: Nov. 17, 2009

(54) ELECTRONIC DEVICE AND METHOD FOR EXECUTING FUNCTIONS

(75) Inventors: Arne Friedrichs, Braunschweig (DE); Gerd Draeger, Braunschweig (DE); Volker Skwarek, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 529 days.

(21) Appl. No.: 10/515,544

(22) PCT Filed: May 9, 2003

(86) PCT No.: PCT/DE03/01485

§ 371 (c)(1),
(2), (4) Date: Jun. 7, 2005

(87) PCT Pub. No.: WO03/100543

PCT Pub. Date: Dec. 4, 2003

(65) Prior Publication Data

US 2005/0234636 A1    Oct. 20, 2005

(30) Foreign Application Priority Data

May 24, 2002   (DE)   ................... 102 23 122

(51) Int. Cl.
*G01C 21/26* (2006.01)
(52) U.S. Cl. .................. 701/200; 340/995.16
(58) Field of Classification Search .......... 701/200, 701/213–215; 342/357.06, 357.12, 357.1; 340/988, 995.16, 995.1
See application file for complete search history.

(56) References Cited

U.S. PATENT DOCUMENTS

| 6,028,537 A | * | 2/2000 | Suman et al. ............... 340/988 |
| 6,107,944 A | | 8/2000 | Behr et al. |
| 6,148,253 A | | 11/2000 | Taguchi et al. |

FOREIGN PATENT DOCUMENTS

| EP | 1139068 | 10/2001 |
| EP | 1167925 | 1/2002 |
| JP | 2000309247 | 11/2000 |
| JP | 200055686 | 9/2001 |
| JP | 2001282824 | 10/2001 |
| JP | 2002131067 | 5/2002 |
| WO | WO 01/22633 | 3/2001 |

* cited by examiner

*Primary Examiner*—Yonel Beaulieu
(74) *Attorney, Agent, or Firm*—Kenyon & Kenyon LLP

(57) ABSTRACT

In an electronic device, in particular a navigation device, having operator-input devices and communications devices for exchanging data with an external, central computer, at least one operator-input device is assigned a function for sending a specific input-identification code uniquely assigned to the electronic device and to the respective operator-input device, or for sending function data assigned to the input-identification code, to the external, central computer for executing the at least one function defined by the input-identification code and the function data.

16 Claims, 3 Drawing Sheets

ELECTRONIC DEVICE AND METHOD FOR EXECUTING FUNCTIONS

FIELD OF THE INVENTION

The exemplary embodiment and/or exemplary method of the present invention relates to an electronic device, in particular a vehicle navigation device, having operator-input devices and communications devices for exchanging data with an external, central computer. The exemplary embodiment and/or exemplary method of the present invention also relates to a method for executing functions, using input of an operator at an electronic device, at least one operator-input device being assigned an input identification code and/or function data.

BACKGROUND INFORMATION

Function keys, which are assigned a corresponding function depending on the specific context, are often provided on electronic devices, such as car radios or navigation devices. Thus, e.g. using an arrow key, a cursor may be moved in a menu list, and, within the menu for controlling a CD player, for example, a song on the CD may be skipped. Therefore, the functionality of these function keys changes as a function of the menu item.

In addition, there are function keys on electronic devices, that may be assigned a personally allocated function by a user, using manual configuration. Thus, a user of a personal computer may link a certain, frequently used menu function to a particular key combination (short-cut function).

Additionally, there are so-called help keys, which are dependent on the menu or context in which the user finds himself during his selection. Upon manipulation of the help key, help or information referring to the corresponding menu item or context is displayed, in each instance, to the user.

These assignments of functions to function keys are relatively rigid. In addition, the electronic devices are relatively complicated to operate, in particular for implementing complex functions, and require several operating steps. Above all, when they are operated in vehicles, this may disadvantageously demand the attention of the driver.

SUMMARY OF THE INVENTION

Therefore, an object of the exemplary embodiment and/or exemplary method of the present invention was to provide an improved electronic device, which executes an assigned function or brings about the implementation of the function when an operator-input device is manipulated, whereby the assignment of the functions to the operator-input devices should be able to be controlled in a flexible manner.

The object may be achieved by the exemplary electronic device described herein, in that at least one operator-input device is assigned a function for sending a specific input identification code uniquely assigned to the electronic device and to the specific operator-input device, or for sending function data assigned to the input-identification code, to the external, central computer for the implementation of the at least one function defined by the input-identification code and function data.

Therefore, the exemplary embodiment and/or exemplary method of the present invention provides for the assignment of the functions to the operator-input devices to be carried out in an external, central computer.

The implementation of the function is initiated by manipulating an operator-input device. Then, either an input-identification code uniquely assigned to the operator-input device, e.g. to an action (menu) key, is sent to the central computer. The assignment of the input-identification code to the function data is stored in a function database in the central computer. This function database is analyzed, and, from these function data, the execution of the at least one function connected to them is started.

As an alternative to sending an input-identification code, function data may already be uniquely assigned to operator-input devices in the electronic device, as well. The function data are then sent to the external, central computer, e.g. as an action (menu) field. There, the at least one function to be implemented is ascertained from the action field with the aid of a function database, and the execution of the at least one function is started.

The execution of the functions may be initiated by sending the function commands back to the electronic device and implementing them in the electronic device. To this end, the electronic device receives and executes function commands generated by the central computer on the basis of the sent input-identification code or function data.

In addition, the electronic device may also receive a function selection list (function menu) generated by the central computer on the basis of the sent input-identification code or function data, in order to select functions from the function menu. Therefore, in response to manipulation of an operator-input device, further, selectable functions in the function menu are sent back to the electronic device via the central computer. The electronic device may select further functions from this function menu. In this case, the editing of the function menu is also not carried out, in turn, in the electronic device, but rather in the central computer. This has the advantage that, in addition to the function database, also a function menu may be edited and adapted via a network of further input terminals.

The object is also achieved by the exemplary method, using the steps:

Sending the input-identification code and/or the function data of a manipulated operator-input device from the electronic device to an external central computer;

the central computer ascertaining function commands, which are assigned to the sent input-identification code and/or the function data in a function database; and executing the function commands.

The evaluation of the input-identification code and/or function data assigned to an operator-input device in the central computer, with the aid of a function database, has the advantage that the function data base may be edited, using external access. Therefore, functions may be externally assigned to specific operator-input devices in a highly user-friendly manner.

The execution of the function commands occurs, for example, via the central computer (the function commands are executed, for example, by the central computer). However, the ascertained function commands may also be sent back to the electronic device by the central computer. The function commands are then executed by the electronic device itself.

It may be advantageous when the function database in the central computer is edited from an input terminal, using network access, in particular over the Internet. The input terminal may be any Internet computer, whereby access to the function database should be protected by a password. In addition, in the case of access, only the function data that the user is authorized to access should be able to be edited. The access authorization should be granted with regard to the electronic devices.

It may be advantageous when the function data edited from an input terminal are sent back to the electronic terminal for further selection via the operator-input device. In this manner, not only is the function database in the central computer maintained via the input terminals, but also the corresponding entries in the electronic device.

DETAILED DESCRIPTION

Figure 1:
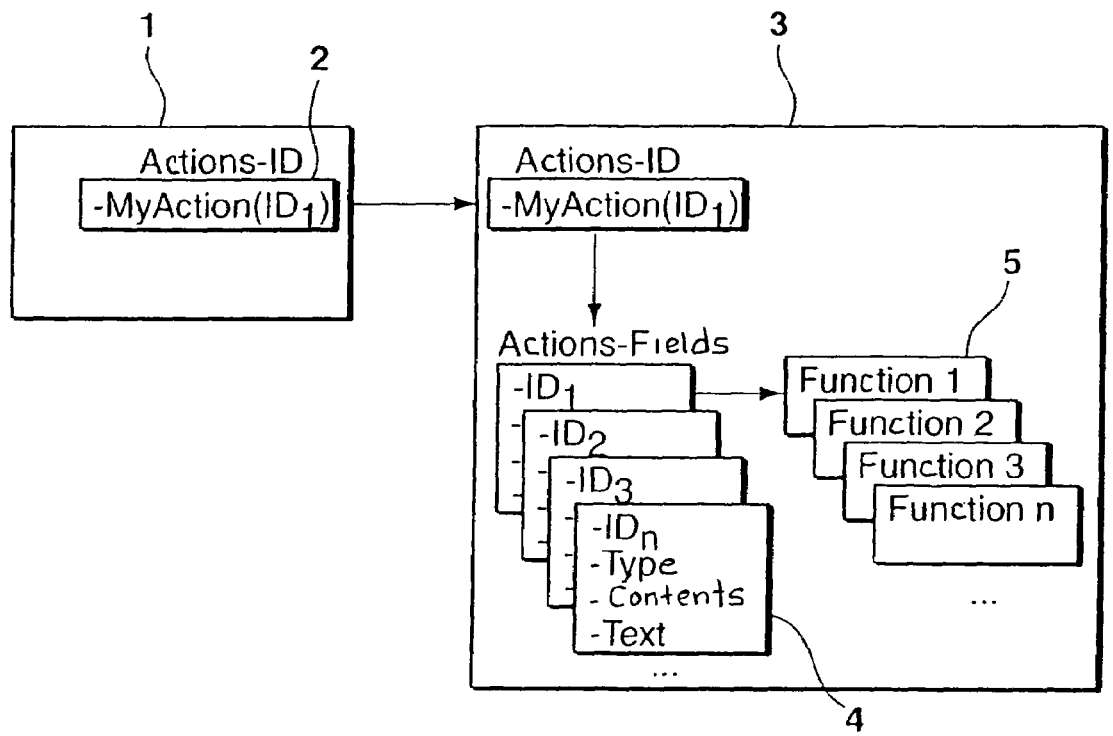
FIG. 1 shows a schematic representation of a first specific embodiment of the method according to the exemplary embodiment and/or exemplary method of the present invention, where input-identification codes are sent.

FIG. 1 shows a first exemplary embodiment and/or exemplary method according to the present invention in the form of a schematic block diagram. By manipulating an operator-input device, e.g. an action (menu) key, on an electronic device 1, an input-identification code 2 (action ID) linked to this operator-input device is sent to a central computer 3 networked with electronic device 1. For example, the transmission may be wireless when electronic device 1 is installed in a vehicle. In a corresponding function database in central computer 3, the at least one corresponding function belonging to input-identification code 2 (action ID), in this instance containing MyAction ($ID_1$), is now ascertained from all available function data 4 or action fields. In addition to unique input-identification code 2 (action ID), function data 4 may contain, as an action field, the information necessary for executing a function, such as action type, action content, and further information. The entries "send SMS," "calculate route and send it to the electronic device," etc. may be provided, for example, as an action type. Predefined SMS (Short Message System) text, a starting/destination description for a route, etc., may be defined, for example, as action content. Text information may be stored, for example, as further information.

Function 5 belonging to function data 4 is now determined and the execution of function 5 initiated by central computer 3. As outlined in this example, the function may be implemented by central computer 3, e.g. by sending off a short message (SMS) to a cellular phone.

Figure 2:
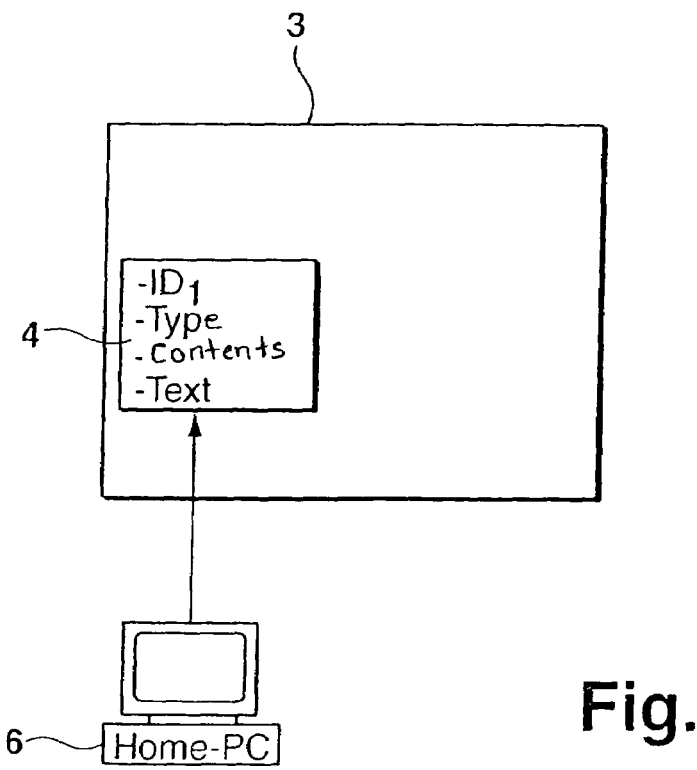
FIG. 2 shows a schematic representation of the editing of the function database in the central computer.

As outlined in FIG. 2, the function database is rendered available in central computer 3 in such a manner, that it may be modified from a decentralized input terminal at any time, via a network, e.g. the Internet. In this context, the editing is carried out while following specific, stipulated formatting rules, access to the function database preferably being protected by a password.

A user of an electronic device 1, for example a so-called offboard navigation device, may dial in via an input terminal 6, for example a home computer, at central computer 3 of a so-called service provider for electronic device 1. In addition to the conventional navigation services for the navigation device, such as route guidance, travel guide, etc., central computer 3 also supports further functions. To this end, on central computer 3, e.g. via the Internet page of the service provider, the user is offered different functions for operator-input devices of electronic device 1, i.e. for particular action (menu) keys. This could be, for example, the sending of a short message to a cellular phone (SMS), the starting of a guidance system, the planning of a tour, etc.

When the user decides on the function "start navigation system," he is prompted to define a destination. In this connection, e.g. a permanent address may be entered, or a point of interest (POI), e.g. train stations, airports, museums, etc., may be defined. For example, restaurant chains may also be specified as a point of interest. When such a restaurant-chain category is selected, further information for defining the function and the assignment to a particular operator-input device of electronic device 1 is no longer necessary, and the editing operation is terminated. After confirmation of the inputs, a field for function data 4 (action field) is generated in a special function database in central computer 3 and stored in a personal region only accessible to the user and the service provider.

After a subsequently occurring, longer trip with the aid of the navigation device, the user may find himself on an expressway, for example, and would like to eat something as soon as possible. To this end, the action key of the operator-input device is manipulated. As a result, input-identification code 2 of the manipulated operator-input device is sent to central computer 3. There, an analysis of the function database determines that it is a navigation action, so that in central computer 3, the current location of the vehicle is automatically determined and a route to the nearest restaurant of the desired restaurant chain is calculated. The route data are then transmitted to the navigation device, so that it may assume the further navigation to the ascertained restaurant.

In a similar manner, specific telephone numbers and text for short messages may also be defined by the user in the function database of central computer 3, using input terminal 6. If a situation now occurs, in which the predefined message should be sent out, this may be accomplished very easily by the user, by manipulating the assigned operator-input device in electronic device 1. The short message is then sent out by central computer 3, using function data 4 stored there.

The ability to edit function data 4, e.g. from external input terminals 6 via the Internet, has even more far-reaching advantages. For example, a person other than the user may input further destinations and plan the route. Thus, e.g. a transporter may guide his vehicle fleet, in that the data regarding the next destination to be stopped at are input into the function database by a dispatcher. A driver may then retrieve the next destination to be stopped at from central computer 3, by manipulating an action key or an operator-input device in a vehicle navigation device, the vehicle navigation device then assuming the further navigation. In this manner, it is no longer necessary for the driver to program the further destinations. In the same way, functions may also be assigned to the operator-input devices by an office for business people. As mentioned above, different destinations to be stopped at, or also further services such as short messages, traffic-jam information, activation of telephone calls, etc., may be specified by the office.

Figure 3:
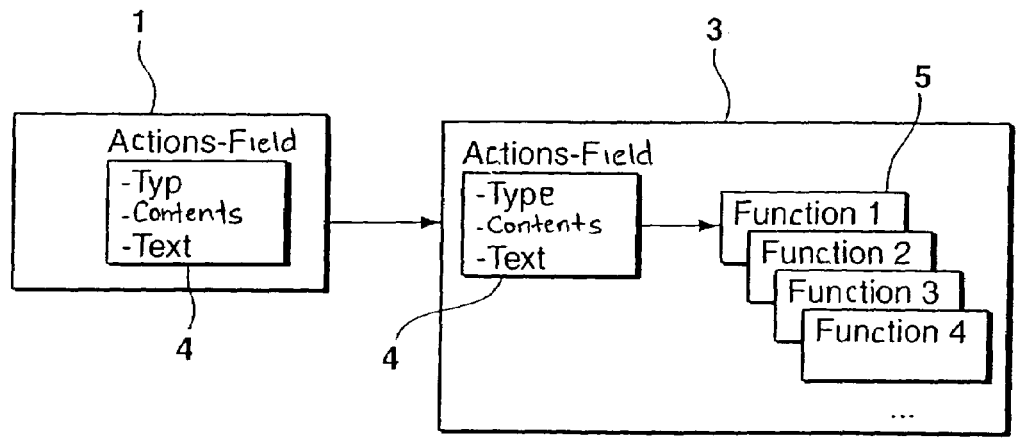
FIG. 3 shows a schematic representation of a second specific embodiment of the method according to the exemplary embodiment and/or exemplary method of the present invention, where function data are sent.

FIG. 3 shows another exemplary embodiment and/or exemplary method according to the present invention in the form of a schematic block diagram. In this case, when an operator-input device is manipulated, no input-identification code 2 is transmitted by electronic device 1, but rather function data 4 in the form of an action field. In this specific embodiment, the detail information belonging to a function is therefore stored as field data 4 in electronic device 1 itself, and not in central computer 3, as before.

Function data 4 are sent to central computer 3. At least one function 5 belonging to function data 4 is stored there in a function database. By analysis of function data 4, corresponding function 5 or a series of functions 5 is ascertained from the function database and executed.

Figure 4:
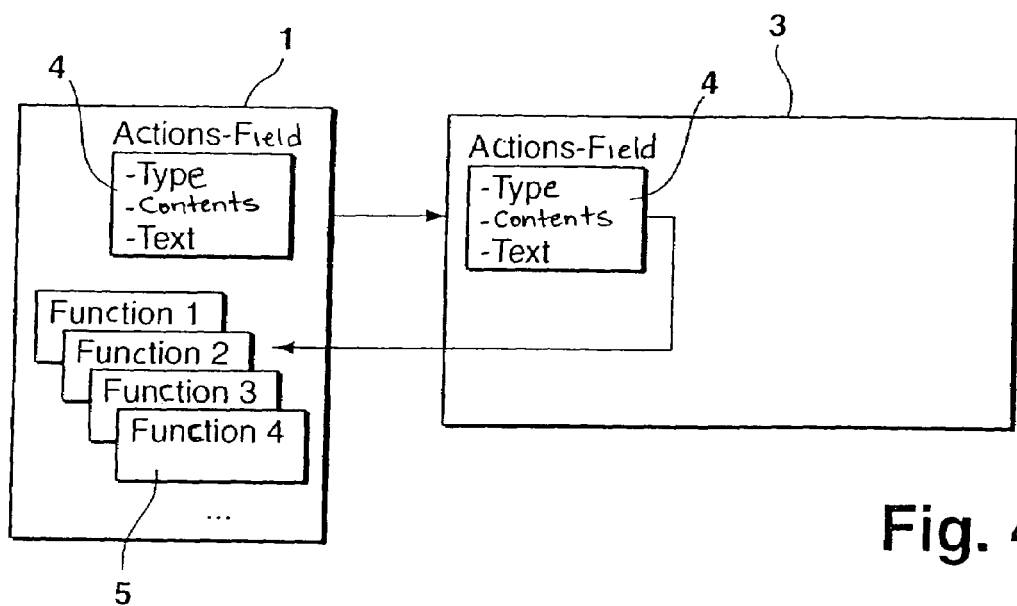
FIG. 4 shows a schematic representation of the sending of function commands by the central computer to the electronic device.

FIG. 4 shows a modification of the method from FIG. 3. In this connection, the at least one function 5 ascertained in the function database of central computer 3 is sent back to electronic device 1 for further execution. There, this at least one function 5 is then executed.

In the specific embodiment of the method outlined in FIGS. 3 and 4, functions 5 alone, but not the function data, may be externally edited in central computer 3, using input terminals 6.

Figure 5:
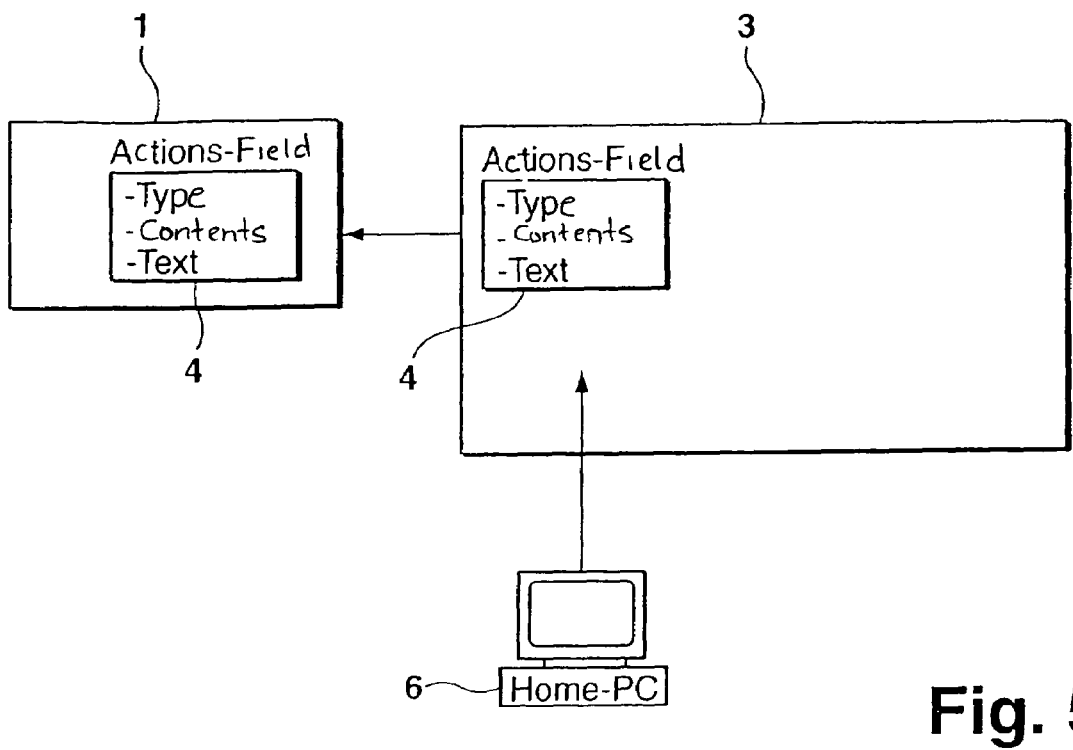
FIG. 5 shows a schematic representation of the editing and relaying of function data to the electronic device.

However, as FIG. 5 indicates, it is even possible to edit function data 4 in central computer 3, via an input terminal 6. To this end, it is provided that the action field for function data 4 be able to be edited in central computer 3 and transmitted back to electronic device 1. In electronic device 1, function data 4 are then received and assigned to a specific action key, i.e. to a specific operator-input device.

As an alternative to this, the action field having function data 4 may, however, also be directly edited or redefined in electronic device 1 or, for example, edited or redefined via specific short messages of a cellular phone.

Figure 6:
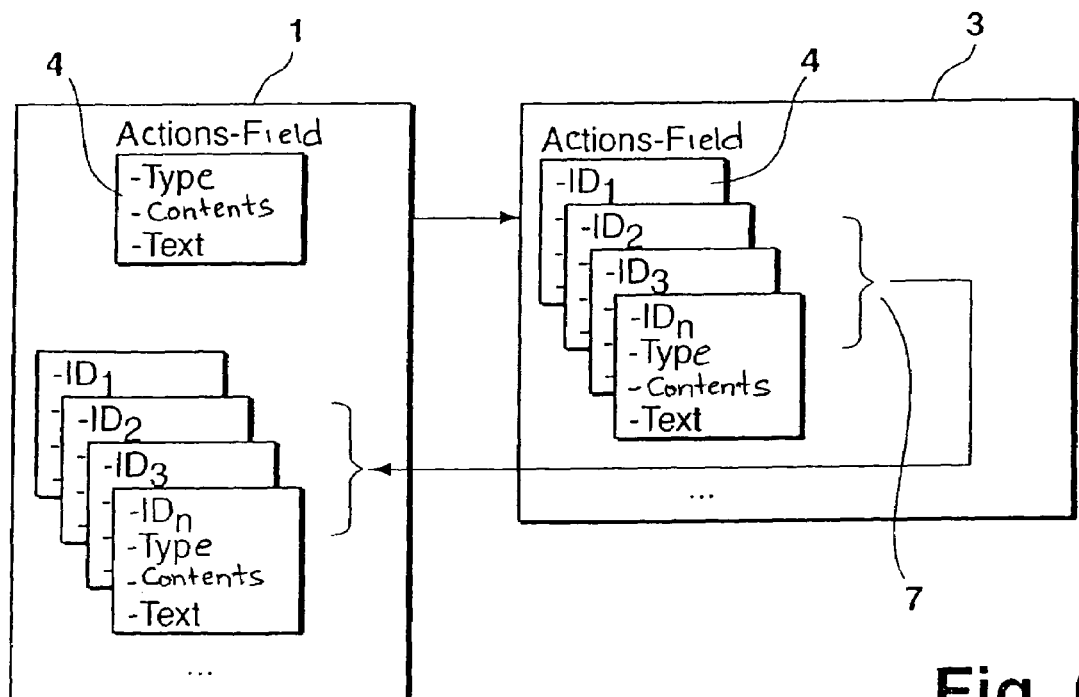
FIG. 6 shows a schematic representation of the exemplary method according to the exemplary embodiment and/or exemplary method of the present invention, where a function menu is sent to the electronic device.

FIG. 6 shows another exemplary embodiment and/or exemplary method according to the present invention, in which, after an operator-input device is manipulated, a function 5 is directly executed, unlike previously. Instead, one of transmitted input-identification code 2 or function menu 7, is generated in the function database of central computer 3, the transmitted input-identification code or the function menu assigned to the function data being transmitted back to electronic device 1. In electronic device 1, the user may then select a desired function or action from this function menu 7 and cause it to be executed. This specific embodiment provides a menu mode, which may now be externally maintained and controlled via central computer 3 and input terminals 6 accessing it.

The invention claimed is:

1. An electronic vehicle navigation device, comprising:
operator-input devices and communication devices for exchanging data with an external central computer, wherein at least one of the operator-input devices is configured to send one of (i) a specific input-identification code uniquely assigned to the electronic device and the respective operator-input device and (ii) function data assigned to the input-identification code, to the external central computer, which, responsive to receiving only the one of the input-identification code and the function data, is configured to:
determine a function previously assigned to the one of the input-identification code and the function data, and
initiate execution of the function;
wherein the specific input-identification code uniquely assigned to the electronic device and the respective operator-input device and the function data assigned to the input-identification code are each sendable but only one is selected to be sent.

2. The electronic device of claim 1, wherein the electronic device receives and executes function commands generated by the central computer based on one of the sent input-identification code and the function data.

3. The electronic device of claim 1, wherein the electronic device receives a function menu generated by the central computer based on one of the sent input-identification code and the function data to select functions from the function menu.

4. A method for executing functions, using an operator-input at an electronic device, at least one operator-input device being uniquely assigned at least one of an input-identification code and function data, the method comprising:
sending one of the input-identification code and the function data of a manipulated operator-input device from the electronic device to an external central computer; and
at the computer, responsive to receiving only the one of the input-identification code and the function data, performing the following:
determining function commands, which were previously assigned to one of the sent input-identification code and the function data in a function database, and initiating execution of the function commands;
wherein the specific input-identification code uniquely assigned to the electronic device and the respective operator-input device and the function data assigned to the input-identification code are each sendable but only one is selected to be sent.

5. The method of claim 4, wherein the execution of the function commands occurs via the central computer so that the function commands are executed by the central computer.

6. The method of claim 4, wherein the function database in the central computer is edited from an input terminal by assigning functions to the at least one of the input-identification code and the function data, using network access.

7. The method of claim 4, wherein the central computer sends the ascertained function commands back to the electronic device which executes the function commands.

8. The method of claim 4, wherein the function data in the function database are edited from an input terminal, using network access via the Internet, and the edited function data are sent to the electronic device for further selection with the aid of the operator-input devices.

9. The method of claim 4, wherein at least one of the function data and the input-identification codes are sent in one of encoded form and encrypted form.

10. The method of claim 4, wherein the function is an electronic navigation command and the function data includes navigation parameters, such that the electronic navigation command is automatically executed upon receipt of the one of the input-identification code and the function data.

11. The method of claim 4, wherein the execution of the function commands occurs via the central computer so that the function commands are executed by the central computer, wherein the function database in the central computer is edited from an input terminal by assigning functions to the at least one of the input-identification code and the function data, using network access, and wherein at least one of the function data and the input-identification codes are sent in one of encoded form and encrypted form.

12. The method of claim 11, wherein the function is an electronic navigation command and the function data includes navigation parameters, such that the electronic navigation command is automatically executed upon receipt of the one of the input-identification code and the function data.

13. The method of claim 4, wherein the execution of the function commands occurs via the central computer so that the function commands are executed by the central computer, wherein the function database in the central computer is edited from an input terminal by assigning functions to the at least one of the input-identification code and the function data, using network access, wherein the central computer sends the ascertained function commands back to the electronic device which executes the function commands, and wherein the function data in the function database are edited from an input terminal, using network access via the Internet, and the edited function data are sent to the electronic device for further selection with the aid of the operator-input devices.

14. The method of claim 13, wherein the function is an electronic navigation command and the function data includes navigation parameters, such that the electronic navigation command is automatically executed upon receipt of the one of the input-identification code and the function data.

15. The electronic device of claim 1, wherein the function is an electronic navigation command and the function data includes navigation parameters, such that the electronic navigation command is, without further input from the at least one of the operator-input devices, automatically executed upon receipt of the one of the input-identification code and the function data.

16. The electronic device of claim 1, wherein the function is an electronic navigation command and the function data includes navigation parameters, such that the electronic navigation command is, without further input from the at least one of the operator-input devices, automatically executed upon receipt of the one of the input-identification code and the function data, wherein the electronic device receives and executes function commands generated by the central computer based on one of the sent input-identification code and the function data, and wherein the electronic device receives a function menu generated by the central computer based on one of the sent input-identification code and the function data to select functions from the function menu.

* * * * *

UNITED STATES PATENT AND TRADEMARK OFFICE
CERTIFICATE OF CORRECTION

PATENT NO.       : 7,620,492 B2                              Page 1 of 1
APPLICATION NO.  : 10/515544
DATED            : November 17, 2009
INVENTOR(S)      : Friedrichs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 809 days.

Signed and Sealed this

Twenty-sixth Day of October, 2010

David J. Kappos
*Director of the United States Patent and Trademark Office*